US010783353B2

(12) United States Patent
Tan

(10) Patent No.: US 10,783,353 B2
(45) Date of Patent: *Sep. 22, 2020

(54) METHOD FOR DETECTING SKIN REGION AND APPARATUS FOR DETECTING SKIN REGION

(71) Applicant: Tencent Technology (Shenzhen) Company Limited, Shenzhen (CN)

(72) Inventor: Guofu Tan, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/666,075

(22) Filed: Oct. 28, 2019

(65) Prior Publication Data

US 2020/0065561 A1 Feb. 27, 2020

Related U.S. Application Data

(63) Continuation of application No. 15/705,102, filed on Sep. 14, 2017, now Pat. No. 10,489,635, which is a (Continued)

(30) Foreign Application Priority Data

Oct. 26, 2015 (CN) .......................... 2015 1 0700287

(51) Int. Cl.
*G06K 9/40* (2006.01)
*G06K 9/00* (2006.01)
(Continued)

(52) U.S. Cl.
CPC ..... *G06K 9/00268* (2013.01); *G06K 9/00234* (2013.01); *G06K 9/4652* (2013.01);
(Continued)

(58) Field of Classification Search
None
See application file for complete search history.

(56) References Cited

U.S. PATENT DOCUMENTS

2004/0218832 A1* 11/2004 Luo .................... H04N 1/6027
382/274
2005/0175227 A1 8/2005 Paschalakis
(Continued)

FOREIGN PATENT DOCUMENTS

| CN | 101251890 A | 8/2008 |
| CN | 101251898 A | 8/2008 |

(Continued)

OTHER PUBLICATIONS

Tencent Technology, ISRWO, PCT/CN2016/084528, dated Aug. 24, 2016, 9 pgs.

(Continued)

*Primary Examiner* — Sean M Conner
(74) *Attorney, Agent, or Firm* — Morgan, Lewis & Bockius LLP

(57) ABSTRACT

A method for identifying skin region in an image includes: selecting a pixel in the target image; calculating a first probability of the pixel in a first color space, the first probability being a probability that the pixel represents skin in the first color space; calculating a second probability of the pixel in a second color space distinct from the first color space, the second probability being a probability that the pixel represents skin in the second color space; determining a combined probability that the pixel in the target image represents skin based on the first probability and the second probability; expanding the pixel into a skin region in the target image by repeating said steps of determining a combined probability that another pixel adjacent to the pixel represents skin until the skin region reaches a predefined (Continued)

size threshold; and performing a predefined beautifying process to the pixels.

17 Claims, 7 Drawing Sheets

Related U.S. Application Data continuation-in-part of application No. PCT/CN2016/084528, filed on Jun. 2, 2016.

(51) Int. Cl.
    *G06K 9/46*      (2006.01)
    *G06T 7/90*      (2017.01)
    *G06T 7/143*      (2017.01)
    *G06T 7/12*      (2017.01)
    *G06K 9/62*      (2006.01)
    *G06T 7/40*      (2017.01)

(52) U.S. Cl.
    CPC .............. *G06K 9/6292* (2013.01); *G06T 7/12* (2017.01); *G06T 7/143* (2017.01); *G06T 7/40* (2013.01); *G06T 7/90* (2017.01); *G06T 2207/10024* (2013.01); *G06T 2207/20076* (2013.01); *G06T 2207/30201* (2013.01)

(56) References Cited

U.S. PATENT DOCUMENTS

| | | |
|---|---|---|
| 2008/0298704 A1 | 12/2008 | Nachlieli et al. |
| 2010/0172578 A1* | 7/2010 | Reid .................. G06K 9/00234 382/165 |
| 2010/0272363 A1* | 10/2010 | Steinberg ........... G06K 9/00288 382/190 |
| 2011/0182509 A1 | 7/2011 | Free |
| 2011/0299776 A1* | 12/2011 | Lee .................... G06K 9/00234 382/173 |
| 2013/0251202 A1* | 9/2013 | Auberger ........... G06K 9/00248 382/103 |
| 2013/0279802 A1 | 10/2013 | Van der Merwe |
| 2016/0027191 A1 | 1/2016 | Wang et al. |
| 2016/0086316 A1* | 3/2016 | Lee .......................... G06T 5/20 382/167 |

FOREIGN PATENT DOCUMENTS

| | | |
|---|---|---|
| CN | 101344922 A | 1/2009 |
| CN | 101882223 A | 11/2010 |
| CN | 102096823 A | 6/2011 |
| CN | 102324020 A | 1/2012 |
| CN | 103927719 A | 7/2014 |
| CN | 103971344 A | 8/2014 |
| CN | 104318558 A | 1/2015 |
| CN | 104732206 A | 6/2015 |

OTHER PUBLICATIONS

Tencent Technology, IPRP, PCT/CN2016/084528, dated May 1, 2018, 7 pgs.

* cited by examiner

METHOD FOR DETECTING SKIN REGION AND APPARATUS FOR DETECTING SKIN REGION

CROSS-REFERENCE TO RELATED APPLICATIONS

This application is a continuation of U.S. patent application Ser. No. 15/705,102, entitled "METHOD FOR DETECTING SKIN REGION AND DEVICE FOR DETECTING SKIN REGION" filed on Sep. 14, 2017, which is a continuation-in-part application of PCT/CN2016/084528, entitled "METHOD FOR DETECTING SKIN REGION AND DEVICE FOR DETECTING SKIN REGION" filed on Jun. 2, 2016, which claims priority to Chinese Patent Application No. 201510700287.3, filed with the Chinese Patent Office on Oct. 26, 2015 and entitled "METHOD FOR DETECTING SKIN REGION AND APPARATUS FOR DETECTING SKIN REGION", all of which are incorporated herein by reference in their entirety.

FIELD OF THE TECHNOLOGY

The present disclosure relates to the field of computer technologies, and in particular, to a method for detecting a skin region and an apparatus for detecting a skin region.

BACKGROUND OF THE DISCLOSURE

With the popularization of taking photos by using digital cameras and mobile phones, an increasingly large quantity of pictures are taken. However, due to reasons such as lighting, camera equipment, personal appearance, shooting angles, shooting positions, and lens distortions, effects (especially skin parts) of some pictures are usually unsatisfactory. Therefore, many users need to process skin regions in photos.

During picture processing, it is difficult to determine a skin region. Currently, a method is that professionals select a skin region by using a selection tool in image processing software such as Photoshop. However, learning costs of the method are high, and operations of the method are relatively complex. Consequently, it is difficult for common users to master the method.

SUMMARY

Embodiments of the present technology provide a method for detecting a skin region and an apparatus for detecting a skin region, so that a skin region in a picture can be automatically detected.

An embodiment of the present technology provides a method for detecting a skin region, including:

obtaining a target image;

obtaining a preset mean value and a preset standard deviation of skin in an RGB color space and a preset mean value and a preset standard deviation of skin in a YUV color space;

calculating a first probability of each pixel in the target image according to the preset mean value and the preset standard deviation in the RGB color space, the first probability being a probability that the pixel is skin in the RGB color space;

calculating a second probability of each pixel in the target image according to the preset mean value and the preset standard deviation in the YUV color space, the second probability being a probability that the pixel is skin in the YUV color space; and determining a probability that each pixel in the target image is skin, the probability that the pixel is skin being an arithmetic mean value of the first probability and the second probability of the pixel.

Optionally, the preset mean value of skin in the RGB color space includes a preset mean value $m_r$ of a red light component, a preset mean value $m_g$ of a green light component, and a preset mean value $m_b$ of a blue light component, and the preset standard deviation of skin in the RGB color space includes a preset standard deviation $n_r$ of the red light component, a preset standard deviation $n_g$ of the green light component, and a preset standard deviation $n_b$ of the blue light component; and the calculating a first probability of each pixel in the target image according to the preset mean value and the preset standard deviation in the RGB color space includes:

calculating a first parameter i of the pixel according to a formula $i=1-|r-m_r|/3n_r$, where r is a luminance value of the red light component of the pixel, when $1-|r-m_r|/3n_r$ is less than 0, $i=0$, and when $1-|r-m_r|/3n_r$ is greater than 1, $i=1$;

calculating a second parameter j of the pixel according to a formula $j=1-|g-m_g|/3n_g$, where g is a luminance value of the green light component of the pixel, when $1-|g-m_g|/3n_g$ is less than 0, $j=0$, and when $1-|g-m_g|/3n_g$ is greater than 1, $j=1$;

calculating a third parameter k of the pixel according to a formula $k=1-|b-m_b|/3n_b$, where b is a luminance value of the blue light component of the pixel, when $1-|b-m_b|/3n_b$ is less than 0, $i=0$, and when $1-|b-m_b|/3n_b$ is greater than 1, $k=1$; and calculating the first probability P1 of the pixel according to a formula $P1=i^{1-i} \times j^{1-j} \times k^{1-k}$.

Optionally, the preset mean value in the YUV color space includes preset mean values $m_u$ and $m_v$ of chrominance, and the preset standard deviation in the YUV color space includes preset standard deviations $n_u$ and $n_v$ of chrominance; and the calculating a second probability of each pixel in the target image according to the preset mean value and the preset standard deviation in the YUV color space includes:

calculating a fourth parameter p of the pixel according to a formula $p=1-|u-m_u|/3n_u$, where u is a hue value of the pixel;

calculating a fifth parameter q of the pixel according to a formula $q=1-|v-m_v m_v|/3n_v$, where v is a saturation value of the pixel; and calculating the second probability P2 of the pixel according to a formula $P2=p^{1-p} \times q^{1-q}$.

Optionally, after the determining a probability that each pixel in the target image is skin, the method further includes:

calculating a gray-scale value of each pixel in the target image, where the gray-scale value of the pixel is a product of the probability that the pixel is skin and 255; and calculating the gray-scale value of each pixel in the target image by using a contour searching algorithm, and when a particular contour is obtained in the target image, setting the gray-scale value of each pixel and a probability that each pixel in the particular contour is skin to 0, where the particular contour is a contour whose length and/or width is less than five pixels.

Optionally, after the determining a probability that each pixel in the target image is skin, the method further includes:

calculating a gray-scale value of each pixel in the target image, where the gray-scale value of the pixel is a product of the probability that the pixel is skin and 255; and performing a Gaussian blur on the gray-scale value of each pixel in the target image; and determining the probability that each pixel in the target image is skin, where the probability that the pixel is skin is the Gaussian blurred gray-scale value of the pixel divided by 255.

An embodiment of the present technology further provides an apparatus for detecting a skin region, including:

a first obtaining module, configured to obtain a target image;

a second obtaining module, configured to obtain a preset mean value and a preset standard deviation of skin in an RGB color space and a preset mean value and a preset standard deviation of skin in a YUV color space;

a first calculation module, configured to calculate a first probability of each pixel in the target image according to the preset mean value and the preset standard deviation in the RGB color space, the first probability being a probability that the pixel is skin in the RGB color space;

a second calculation module, configured to calculate a second probability of each pixel in the target image according to the preset mean value and the preset standard deviation in the YUV color space, the second probability being a probability that the pixel is skin in the YUV color space; and a first determining module, configured to determine a probability that each pixel in the target image is skin, the probability that the pixel is skin being an arithmetic mean value of the first probability and the second probability of the pixel.

Optionally, the preset mean value of skin in the RGB color space includes a preset mean value $m_r$ of a red light component, a preset mean value $m_g$ of a green light component, and a preset mean value $m_b$ of a blue light component, and the preset standard deviation of skin in the RGB color space includes a preset standard deviation $n_r$ of the red light component, a preset standard deviation $n_g$ of the green light component, and a preset standard deviation $n_b$ of the blue light component; and the first calculation module is specifically configured to:

calculate a first parameter i of the pixel according to a formula $i=1-|r-m_r|/3n_r$, where r is a luminance value of the red light component of the pixel, when $1-|r-m_r|/3n_r$ is less than 0, i=0, and when $1-|r-m_r|/3n_r$ is greater than 1, i=1;

calculate a second parameter j of the pixel according to a formula $j=1-|g-m_g|/3n_g$, where g is a luminance value of the green light component of the pixel, when $1-|g-m_g|/3n_g$ is less than 0, j=0, and when $1-|g-m_g|/3n_g$ is greater than 1, j=1;

calculate a third parameter k of the pixel according to a formula $k=1-|b-m_b|/3n_b$, where b is a luminance value of the blue light component of the pixel, when $1-|b-m_b|/3n_b$ is less than 0, i=0, and when $1-|b-m_b|/3n_b$ is greater than 1, k=1; and calculate the first probability P1 of the pixel according to a formula $P1=i^{1-i} \times j^{1-j} \times k^{1-k}$.

Optionally, the preset mean value in the YUV color space includes preset mean values $m_u$ and $m_v$ of chrominance, and the preset standard deviation in the YUV color space includes preset standard deviations $n_u$ and $n_v$ of chrominance; and the second calculation module is specifically configured to:

calculate a fourth parameter p of the pixel according to a formula $p=1-|u-m_u|/3n_u$, where u is a hue value of the pixel;

calculate a fifth parameter q of the pixel according to a formula $q=1-|v-m_v m_v|/3n_v$, where v is a saturation value of the pixel; and calculate the second probability P2 of the pixel according to a formula $P2=p^{1-p} \times q^{1-q}$.

Optionally, the apparatus for detecting a skin region further includes:

a third calculation module, configured to: after the first determining module determines the probability that each pixel in the target image is skin, calculate a gray-scale value of each pixel in the target image, where the gray-scale value of the pixel is a product of the probability that the pixel is skin and 255; and a fourth calculation module, configured to: calculate the gray-scale value of each pixel in the target image by using a contour searching algorithm, and when a particular contour is obtained in the target image, set the gray-scale value of each pixel and a probability that each pixel in the particular contour is skin to 0, where the particular contour is a contour whose length and/or width is less than five pixels.

Optionally, the apparatus for detecting a skin region further includes:

a fifth calculation module, configured to: after the first determining module determines the probability that each pixel in the target image is skin, calculate a gray-scale value of each pixel in the target image, where the gray-scale value of the pixel is a product of the probability that the pixel is skin and 255;

a sixth calculation module, configured to perform a Gaussian blur on the gray-scale value of each pixel in the target image; and a second determining module, configured to determine the probability that each pixel in the target image is skin, where the probability that the pixel is skin is the Gaussian blurred gray-scale value of the pixel divided by 255.

In the present disclosure, after a preset mean value and a preset standard deviation of skin in an RGB color space and a preset mean value and a preset standard deviation of skin in a YUV color space are obtained, each pixel in a target image is separately compared with the preset mean value and the preset standard deviation of skin in the RGB color space and the preset mean value and the preset standard deviation of skin in the YUV color space, so that a probability that each pixel is skin can be accurately calculated. In this way, the probability can be combined in subsequent operations of processing the target image, a skin region in the target image can be determined more precisely for processing, and a skin region in the target image no longer needs to be manually determined before processing.

DESCRIPTION OF EMBODIMENTS

Embodiments of the present technology provide a method for detecting a skin region and an apparatus for detecting a skin region, so that a skin region in a picture can be automatically detected.

To make the solutions of the present disclosure clearer more comprehensible to persons skilled in the art, the following clearly and completely describes the technical solutions in the embodiments of the present technology with reference to the accompanying drawings in the embodiments of the present technology. Apparently, the described embodiments are some of the embodiments of the present technology rather than all of the embodiments. All other embodiments obtained by a person of ordinary skill in the art based on the embodiments of the present technology without creative efforts shall fall within the protection scope of the present disclosure.

In the specification, claims, and accompanying drawings of the present disclosure, the terms the terms "include", "comprise", and any variants thereof are intended to cover a non-exclusive inclusion, such that a process, method, system, product, or device that includes a series of steps or units is not necessarily limited to those steps and units expressly listed, but may include other steps or units not expressly listed or inherent to such process, method, product, or device.

Figure 1:
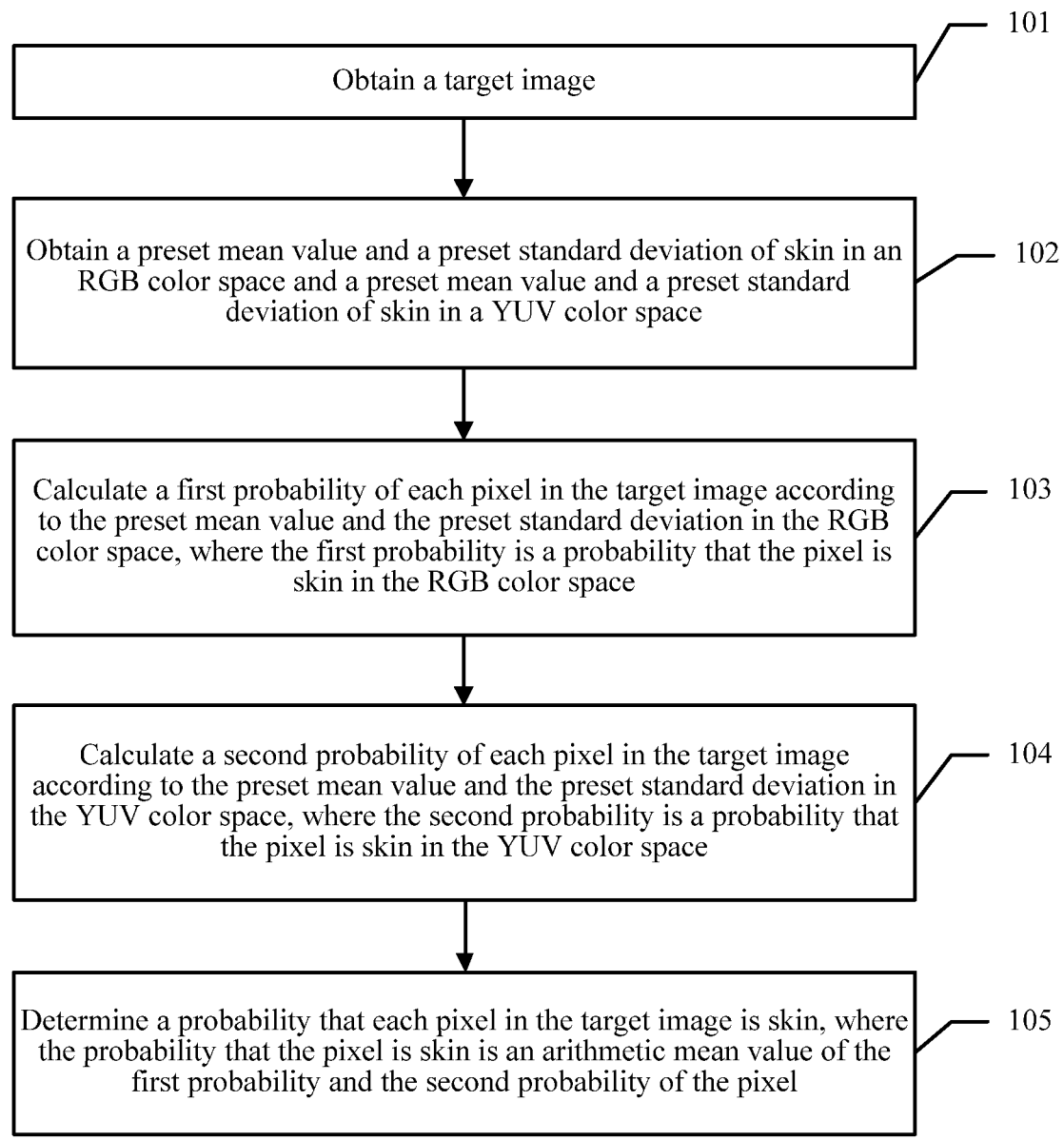
FIG. 1 is a flowchart of an embodiment of a method for detecting a skin region according to the present disclosure.

Referring to FIG. 1, a method for detecting a skin region in an embodiment of the present technology includes the following steps:

101: Obtain a target image.

In this embodiment, the target image is formed by multiple pixels. In an RGB color space, each pixel includes a luminance value r of a red light component, a luminance value g of a green light component, and a luminance value b of a blue light component. In a YUV color space, each pixel includes a hue value u and a saturation value v.

It should be noted that the target image in this embodiment may be an entire original image, or may be a partial image selected from the entire original image, and this is not limited herein.

102: Obtain a preset mean value and a preset standard deviation of skin in an RGB color space and a preset mean value and a preset standard deviation of skin in a YUV color space.

The preset mean value and the preset standard deviation of skin in the RGB color space and the preset mean value and the preset standard deviation of skin in the YUV color space may be prestored in a memory, and are obtained from the memory when calculation needs to be performed. Certainly, the preset mean value and the preset standard deviation of skin in the RGB color space and the preset mean value and the preset standard deviation of skin in the YUV color space may alternatively be obtained by using another method. For example, the preset mean value and the preset standard deviation of skin in the RGB color space and the preset mean value and the preset standard deviation of skin in the YUV color space may be obtained by receiving inputs of the preset mean value and the preset standard deviation of skin in the RGB color space and the preset mean value and the preset standard deviation of skin in the YUV color space. This is not limited herein.

In an implementation manner, the preset mean value and the preset standard deviation of skin in the RGB color space and the preset mean value and the preset standard deviation of skin in the YUV color space may be calculated by using a large quantity of samples of skin pictures. The preset mean value and the preset standard deviation of skin in the RGB color space and the preset mean value and the preset standard deviation of skin in the YUV color space may alternatively be obtained by using another method. In some embodiments, the samples of skin pictures are collected on a per user basis, and each user has his/her own set of samples and the preset mean value and the preset standard deviation of skin in the different color spaces are derived based on the images collected from the user's own photo library. In some embodiments, the same set of sample images are used to derive the preset mean values and the preset standard deviation values in the two different color spaces. The images are converted to their corresponding images in the two different color spaces, and the preset mean values of the images in the two color spaces are obtained separately, and the preset standard deviation values of the images in the two color spaces are obtained separately.

103: Calculate a first probability of each pixel in the target image according to the preset mean value and the preset standard deviation in the RGB color space, where the first probability is a probability that the pixel is skin in the RGB color space.

For a pixel in the target image, a probability that the pixel is skin in the RGB color space may be determined by comparing a specific parameter of the pixel with the obtained preset mean value and preset standard deviation of skin in the RGB color space. There are multiple comparison methods, and one of the methods is described as an example below.

In this embodiment, the preset mean value of skin in the RGB color space includes a preset mean value $m_r$ of a red light component, a preset mean value $m_g$ of a green light component, and a preset mean value $m_b$ of a blue light component, and the preset standard deviation of skin in the RGB color space includes a preset standard deviation $n_r$ of the red light component, a preset standard deviation $n_g$ of the green light component, and a preset standard deviation $n_b$ of the blue light component.

A first parameter i of the pixel is calculated according to a formula $i=1-|r-m_r|/3n_r$, where when $1-|r-m_r|/3n_r$ is less than 0, $i=0$, and when $1-|r-m_r|/3n_r$ is greater than 1, $i=1$.

A second parameter j of the pixel is calculated according to a formula $j=1-|g-m_g|/3n_g$, where when $1-|g-m_g|/3n_g$ is less than 0, $j=0$, and when $1-|g-m_g|/3n_g$ is greater than 1, $j=1$.

A third parameter k of the pixel is calculated according to a formula $k=1-|b-m_b|/3n_b$, where when $1-|b-m_b|/3n_b$ is less than 0, $i=0$, and when $1-|b-m_b|/3n_b$ is greater than 1, $k=1$.

The first probability P1 of the pixel is calculated according to a formula $P1=i^{1-i} \times j^{1-j} \times k^{1-k}$.

When r approximates to $m_r$, i approximates to 1. When g approximates to $m_g$, j approximates to 1. When b approximates to $m_b$, j approximates to 1. Therefore, in the formula for calculating P1, parameters i, j, and k are respectively converted by using formulas $i^{1-i}$, $j^{1-j}$, and $k^{1-k}$, so that when i, j, and k separately approximate to 1, a value of P1 is larger, that is, the probability that the pixel is skin is larger.

One of the comparison methods is described in detail above. In an actual application, a coefficient 3 in the formulas $i=1-|r-m_r|/3n_r$, $j=1-|g-m_g|/3n_g$, and $k=1-|b-m_b|/3n_b$ may alternatively be another value, and this is not limited herein. The formula for calculating the first probability P1 according to i, j, and k may alternatively be another formula, and this is not limited herein.

104: Calculate a second probability of each pixel in the target image according to the preset mean value and the preset standard deviation in the YUV color space, where the second probability is a probability that the pixel is skin in the YUV color space.

For a pixel in the target image, a probability that the pixel is skin in the YUV color space may be determined by comparing a specific parameter of the pixel with the obtained preset mean value and preset standard deviation of skin in the YUV color space. There are multiple comparison methods, and one of the methods is described as an example below.

In this embodiment, the preset mean value in the YUV color space includes preset mean values $m_u$ and $m_v$ of chrominance, and the preset standard deviation in the YUV color space includes preset standard deviations $n_u$ and $n_v$ of chrominance.

A fourth parameter p of the pixel is calculated according to a formula $p=1-|u-m_u|/3n_u$, where u is a hue value of the pixel.

A fifth parameter q of the pixel is calculated according to a formula $q=1-|v-m_v|/3n_v$, where v is a saturation value of the pixel.

The second probability P2 of the pixel is calculated according to a formula $P2=p^{1-p} \times q^{1-q}$.

When u approximates to $m_u$, p approximates to 1. When v approximates to $m_v$, q approximates to 1. Therefore, in the formula for calculating P2, parameters p and q are respectively converted by using formulas $p^{1-p}$ and $q^{1-q}$, so that when p and q separately approximate to 1, a value of P2 is larger, that is, the probability that the pixel is skin is larger.

One of the comparison methods is described in detail above. In an actual application, a coefficient 3 in the formulas $p=1-|u-m_u|/3n_u$ and $q=1-|v-m_v|/3n_v$ may alternatively be another value, and this is not limited herein. The formula for calculating the second probability P2 according to p and q may alternatively be another formula, and this is not limited herein.

105: Determine a probability that each pixel in the target image is skin, where the probability that the pixel is skin is an arithmetic mean value of the first probability and the second probability of the pixel.

For a pixel in the target image, after the probability P1 that the pixel is skin in the RGB color space and the probability P2 that the pixel is skin in the YUV color space are calculated, a mean value of the two probabilities (that is, (P1+P2)/2) may be used as the probability P that the pixel is skin.

After the probability that each pixel in the target image is skin is obtained, when a probability that a pixel is skin is greater than a particular threshold, image processing may be performed on the pixel. The processing may include processing such as brightening the pixel.

In this embodiment, after a preset mean value and a preset standard deviation of skin in an RGB color space and a preset mean value and a preset standard deviation of skin in a YUV color space are obtained, each pixel in a target image is separately compared with the preset mean value and the preset standard deviation of skin in the RGB color space and the preset mean value and the preset standard deviation of skin in the YUV color space, so that a probability that each pixel is skin can be accurately calculated. In this way, the probability can be combined in subsequent operations of processing the target image, a skin region in the target image can be determined more precisely for processing, and a skin region in the target image no longer needs to be manually determined before processing.

In an actual application, the presence of another object (for example, clothes or hair) on the skin region in the target image or another reason may interfere with calculation of a probability that a pixel is skin. Therefore, preferably, in this embodiment, the target image is further processed after step 105, so as to optimize a value of a probability that each pixel is skin. There are multiple processing methods, and two of the methods are described as examples below.

Figure 2:
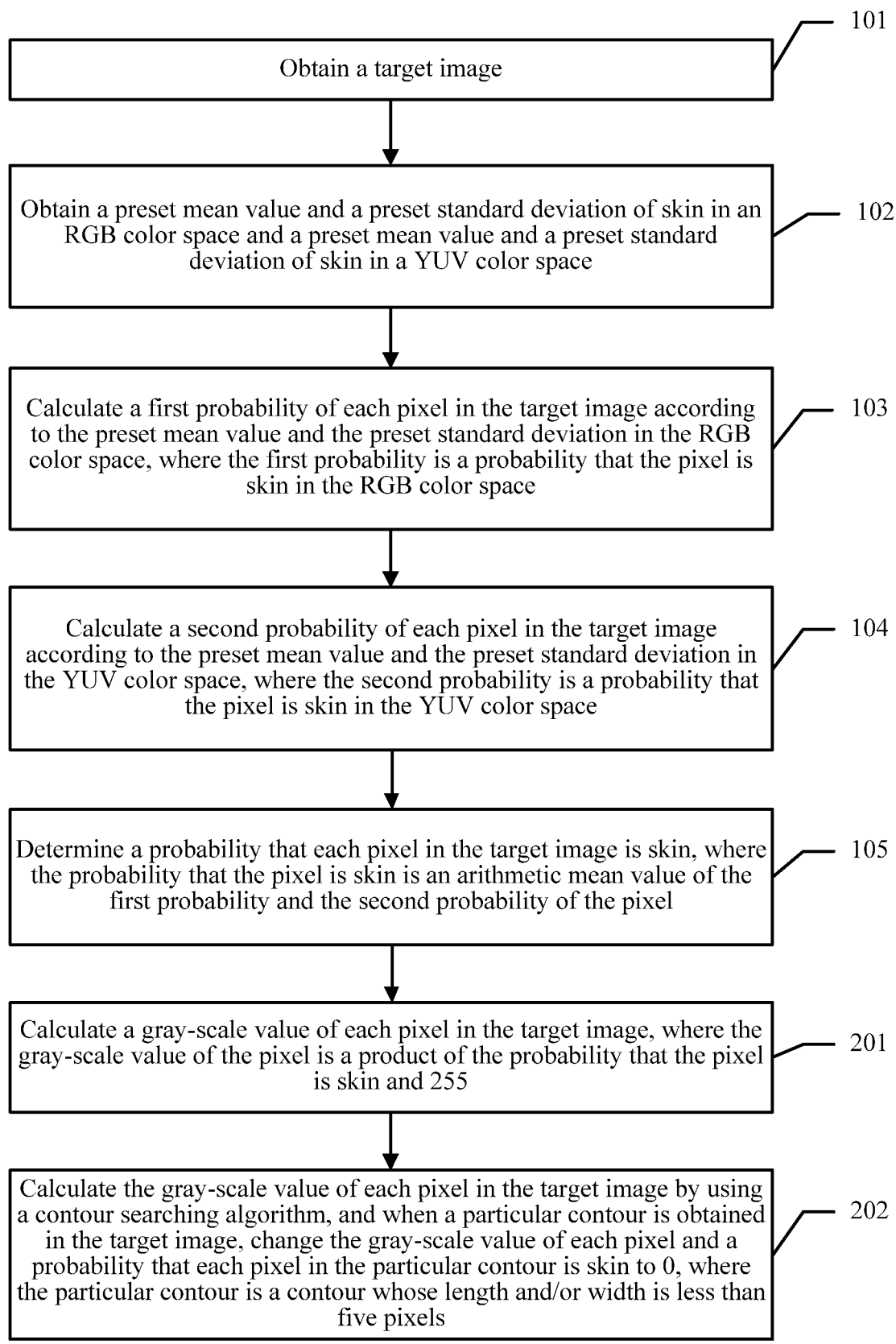
FIG. 2 is a flowchart of an embodiment of a method for detecting a skin region according to the present disclosure.

In Example 1, as shown in FIG. 2, in the method for detecting a skin region in this embodiment, after step 105, the method further includes:

201: Calculate a gray-scale value of each pixel in the target image, where the gray-scale value of the pixel is a product of the probability that the pixel is skin and 255.

In this embodiment, to determine a non-skin region, each probability value is converted into a gray-scale value according to the probability that each pixel in the target image is skin. Specifically, a new image may be obtained by multiplying the probability that each pixel in the target image is skin by a maximum value (that is, 255) of the gray-scale value. In the new image, when a gray-scale value of a region is larger, a possibility that the region is skin is higher.

202: Calculate the gray-scale value of each pixel in the target image by using a contour searching algorithm, and when a particular contour is obtained in the target image, set the gray-scale value of each pixel and a probability that each pixel in the particular contour is skin to 0, where the particular contour is a contour whose length and/or width is less than five pixels.

Because an area of a skin region is usually relatively large, the contour searching algorithm may be used to determine a contour that appears in the target image. The contour searching algorithm is the existing technology, and details are not described herein.

When the contour is relatively small, a possibility that the region enclosed by the contour is skin may be excluded. Therefore, in this embodiment, when it is determined that a contour whose length and/or width is less than five pixels (for ease of description, the contour is referred to as the particular contour) appears in the target image, a possibility that the region in the particular contour is a skin region may be excluded. Therefore, a probability that each pixel in the particular contour is skin is set to 0.

In this way, contour noise in the skin region in the target image can be removed, so that the skin region can be determined more precisely.

Figure 3:
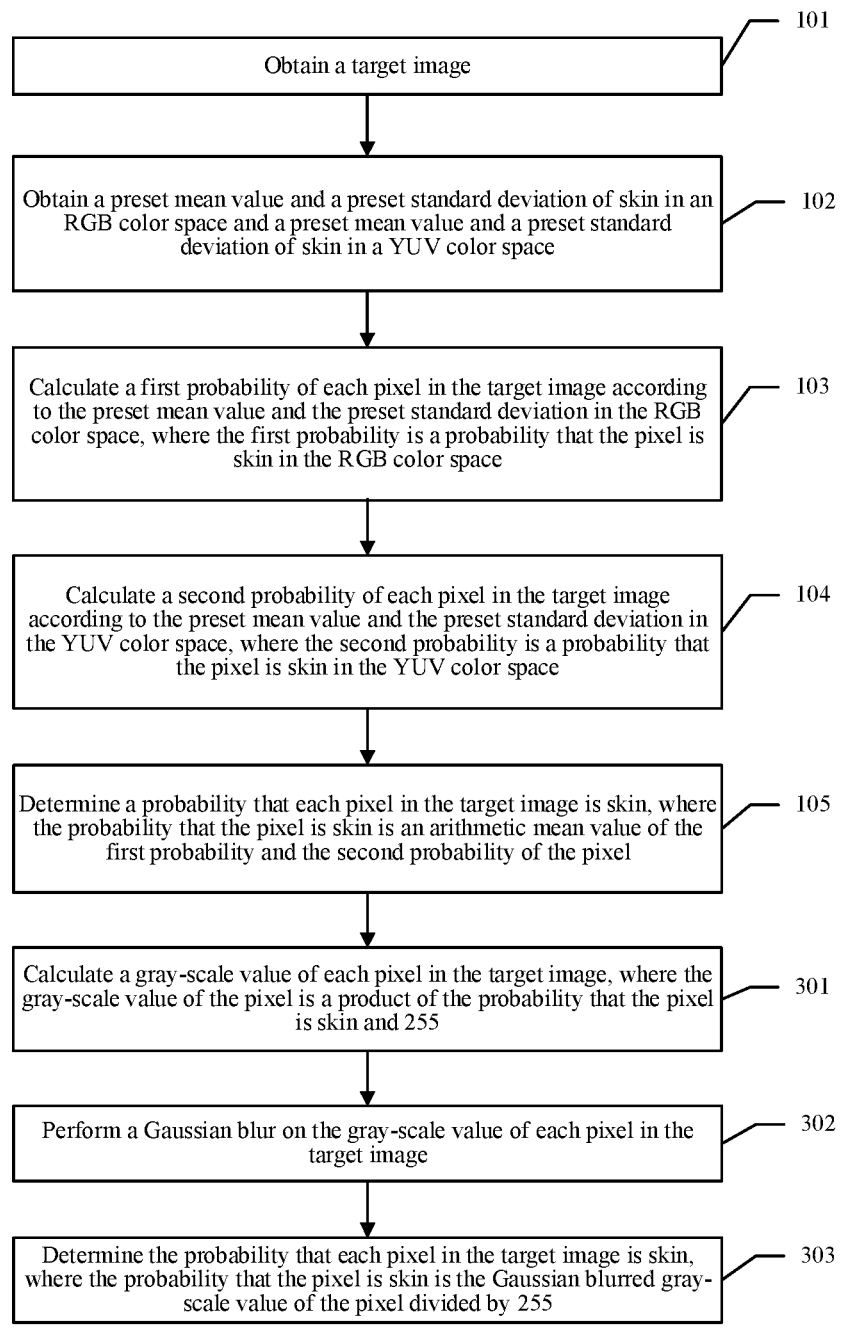
FIG. 3 is a flowchart of an embodiment of a method for detecting a skin region according to the present disclosure.

In Example 2, as shown in FIG. 3, in the method for detecting a skin region in this embodiment, after step 105, the method further includes:

301: Calculate a gray-scale value of each pixel in the target image, where the gray-scale value of the pixel is a product of the probability that the pixel is skin and 255.

In an actual application, an edge of the skin region that appears in the target image may change discontinuously. Therefore, in this embodiment, a Gaussian blur is performed on the target image, so as to ensure the continuity that an edge of the skin region changes. Specifically, first, each probability value is converted into a gray-scale value according to the probability that each pixel in the target image is skin. In this embodiment, specifically, a new image may be obtained by multiplying the probability that each pixel in the target image is skin by a maximum value (that is, 255) of the gray-scale value. In the new image, when a gray-scale value of a region is larger, a possibility that the region is skin is higher.

302: Perform a Gaussian blur on the gray-scale value of each pixel in the target image.

The performing a Gaussian blur on the gray-scale value of each pixel in the target image is the existing technology, and details are not described herein. Specifically, a 3×3 Gaussian blur may be performed. Certainly, the foregoing description is merely an example, and is not limited herein.

303: Determine the probability that each pixel in the target image is skin, where the probability that the pixel is skin is the Gaussian blurred gray-scale value of the pixel divided by 255.

After the Gaussian blur is performed on the target image, the gray-scale value of each pixel in the target image changes. The probability that each pixel is skin may be obtained by dividing the Gaussian blurred gray-scale value of each pixel in the target image by 255.

In this example, the continuity that the edge of the skin region in the target image changes can be ensured.

Example 1 and Example 2 are described above. In an actual application, the methods in Example 1 and Example 2 may alternatively be used simultaneously, and this is not limited herein.

Based on the above, in some embodiments, a method for detecting a skin region in an image, comprising: obtaining a target image; and for each of a plurality of pixels in the target image, calculating a probability that the pixel corresponds to skin captured in the image, wherein calculating the probability includes: calculating a first probability of said each pixel in the target image in a first color space the first probability being a probability that the pixel is skin in the first color space; calculating a second probability of said each pixel in the target image in a second color space that is distinct from the first color space, the second probability being a probability that the pixel is skin in the second color space; and determining a combined probability that said each pixel in the target image is skin, the combined probability that the pixel is skin being an arithmetic mean value of the first probability and the second probability of the pixel.

In some embodiments, the first color space is an RGB color space and the second color space is an YUV color space. In some embodiments, calculating the first probability of said each pixel in the target image in the RGB color space includes calculating the first probability of the pixel according to a preset mean value and a preset standard deviation value of skin in the RGB color space. In some embodiments, calculating the second probability of said each pixel in the target image in the YUV color space includes calculating the second probability of the pixel according to a preset mean value and a preset standard deviation value of skin in the YUV color space. In some embodiments, the preset mean value and the preset standard deviation value of skin in the RGB color space, and the preset mean value and the preset standard deviation value of skin in the YUV space are derived from the same set of training images that include regions corresponding to skin.

In some embodiments, for each pixel of the plurality of pixels in the target image, the method includes: calculating a gray-scale value of said each pixel in the target image, wherein the gray-scale value of the pixel is a product of the probability that the pixel is skin and 255; searching for contours within the image based on the gray-scale values of the plurality of pixels in the target image to identify one or more contours that meet predefine size criteria; and removing the one or more contours from the target image, including resetting respective pixel values of pixels in the one or more contours and the probabilities of the pixels in the one or more contours to be 0.

In some embodiments, the method further includes: performing a Gaussian blur on the gray-scale value of each pixel of the plurality of pixels in the target image; and determining the probability that each pixel of the plurality of pixels in the target image is skin based on the Gaussian blurred gray-scale value of the pixel divided by 255.

In some embodiments, the skin regions are processed (e.g., using one or more beautifying processing methods, such as smoothing, brightening, tinting, blemish removal, etc.). In some embodiments, the method is performed by an electronic device with one or more processors and memory, and optionally, a camera that is configured to capture photo images. In some embodiments, the device obtains an image photographed by a camera (e.g., by intercepting the output of the camera when the shutter of the camera is operated and before the photo is presented to the user, or retrieving an existing photo from a photo library). In some embodiments, instead of obtaining an image photographed by a camera, the device, or continuously receiving an image preview from the camera and perform the image processing method as described herein and present the processed image as the preview image to the user, such that the user can see the processed images before pressing the shutter to actually capture or save the image. In some embodiments, the skin detection is performed on a face captured in the image. The device performs face detection on the image (the captured image or the preview image from the camera) by using a face detection algorithm, to obtain a face pixel set from the image, the face pixel set comprising: a plurality of pixels within an image area belonging to a face detected in the image.

In some embodiments, the device positions a facial feature contour mask over the face pixel set, to obtain a to-be-examined pixel set from the face pixel set, the to-be-examined pixel set comprising: a plurality of pixels within an image area except pixels masked by the facial feature contour mask in the face pixel set. In some embodiments, the facial feature contour mask is a collection of disconnected mask regions corresponding to different facial features, such as eyebrows, eyes, nose, mouth, ear, hairline, mustaches, beard, etc. In some embodiments, the facial feature contour mask is an opaque area for each feature. In some embodiments, the facial feature contour mask includes only boundary lines around the contours of the facial features. For example, with respect to the nose region, the facial feature contour mask only includes the outlines of the nose, and the skin region of the nose is not masked, such that blemishes on the nose are still included in the to-be-examined pixel set. For the eyes and eye brows, the facial feature contour mask include opaque regions covering the entire eyes and eye brows. In some embodiments, the user provide input to choose the components of the facial feature contour mask that is used, for example, the user make choose from a set of eye brow shapes, eye shapes, mouth shapes, and nose shapes to fit the user's particular appearance, or makeup style. In some embodiments, the facial features are automatically identified from the image and removed from the to-be-examined pixel set.

In some embodiments, before the processing continues, after the face detection is completed, the device determines whether the size of the face passes a predefined size threshold. In accordance with a determination that the face size of the detected face does not meet a predefined size threshold (e.g., too small), the device forgoes the subsequent steps to detect or mask the facial features and removing the blemishes, instead, the device prompts the user to retake the photo. In accordance with a determination that the size meets the predefined size threshold, the processing continues as described herein. In some embodiments, when a face is detected, the device further determines if the face is a complete face or a portion of a face with all the facial features (e.g., two eyes, two eye brows, one nose, one mouth, etc.). In some embodiments, the facial feature contour mask is used only if a complete face is detected within the image. In some embodiments, in accordance with a determination that only a portion of the face is detected within the image, the device prompts the user to identify the facial features, e.g., one eye brow, one eye, and a side view of a nose without nostrils being within the imaged area, etc. Once the user has identified the facial features present in the image, the device generates a partial facial feature mask based on the facial features that are actually present in the image. In some embodiments, the device automatically detects the facial features present in the image when the full face is present in the image, and tracks the facial features as the user's face moves such that when some of the facial features are no longer in the image, the device still maintains the information regarding which facial features are still within the image, and generates the partial facial feature mask accordingly. In some embodiments, the device presents the facial feature contour mask over the face in the image and allows the user to provide inputs to adjust the different portions of the facial feature contour mask, e.g., adjusting the positions, orientations, shapes, and sizes of the eye brows, eyes, nose, ears, hairline, facial hair, mouth, etc. In some embodiments, the inputs are touch inputs, e.g., the user may select a feature and drag the feature as a whole to reposition or rotate it, or drag a contour line to reshape and resize the feature. In some embodiments, the user may use simple text input, or voice input to make simple adjustments, such as "move left eye brow up" "continue to move up", "move mouth a little leftward," etc. In some embodiments, the device provides the input means (e.g., a text input box) on the user interface concurrently with the image and the current state of the mask. The text input and voice input is sometimes more convenient than the fine touch inputs required to drag and reshape/resize the facial feature contour, particularly when the user is moving. In some embodiments, the device automatically open the text/voice input interface in response to a determination that the device is in motion (e.g., when the user is walking, running, or on a moving vehicle).

In some embodiments, the device then performs edge contour detection on the to-be-examined pixel set. The device extracts one or more blemish regions from the to-be-examined pixel set, to obtain a to-be-retouched pixel set, the to-be-retouched pixel set comprising: a plurality of pixels within an image area belonging to the one or more blemish regions. The device retouches all pixels in the to-be-retouched pixel set, to obtain a retouched pixel set.

In some embodiments, the device detects an operation instruction that is inputted by a user prior to photographing the image by the camera, wherein the operation instruction triggers a predefined beatifying processing function including the steps of the above processing. The device displaying the retouched pixel set to a user as an output from the camera. For example, the processing is performed, such that the original output of the camera is not shown to the user, instead the retouched image is presented to the user as the output of the camera.

In some embodiments, after displaying the retouched pixel set as the output from the camera, the device displays the image captured by the camera only in response to a request by a user. For example, an affordance is displayed over the retouched image, and in response to an input invoking the affordance, the device displays the original image from the camera, e.g., side by side to the retouched image. In some embodiments, a gesture input (e.g., a horizontal swipe on the face in the image) causes the face to be reverted to the original state in the original image before the retouching.

In some embodiments, the device detects an operation instruction that is inputted by a user after photographing the image by the camera, wherein the operation instruction triggers a predefined beatifying processing function including the steps of the above processing. The device then displays the retouched pixel set to a user in comparison to the image captured by the camera.

In some embodiments, before the performing face detection on the image by using the face detection algorithm, to obtain the face pixel set from the image, the device decodes the image, to obtain an original image information flow, and encodes the original image information flow, to obtain an image satisfying a preset format requirement. The encoding includes: performing format conversion on the image, to obtain an image satisfying a YCrCb format requirement, wherein each pixel in the face pixel set is a pixel comprising a Y component, a Cr component, and a Cb component, and each pixel in the to-be-examined pixel set is a pixel comprising a Y component, a Cr component, and a Cb component. In some embodiments, the performing edge contour detection on the to-be-examined pixel set, and extracting the one or more blemish regions from the to-be-examined pixel set, to obtain the to-be-retouched pixel set comprises: performing image binarization processing on the to-be-examined pixel set; removing one or more pixels whose Cr component has a value of 0 from the to-be-examined pixel set on which image binarization processing has been performed, to obtain an edge contour pixel set; performing a face grayscale image convolution operation on the edge contour pixel set to obtain the edge contour pixel set on which the face grayscale image convolution operation has been accomplished; and identifying the one or more blemish regions from the edge contour pixel set on which the face grayscale image convolution operation has been accomplished.

In some embodiments, the retouching the plurality of pixels in the to-be-retouched pixel set, to obtain the retouched pixel set comprises: changing pixel values of the plurality of pixels in the to-be-retouched pixel set to pixel values of pixels beyond the to-be-retouched pixel set in the to-be-examined pixel set.

In some embodiments, the device accepts user inputs adjusting the blemish discovery and removal processes set forth herein. For example, in some embodiments, the device allows the user to exempt a particular blemish region from being removed. For example, certain birthmarks, moles, beauty marks are essential parts of a person's facial characteristics, and the user may wish to keep them on the image, or only moderately modify them. In some embodiments, the device after identifying the blemish regions in the face, presents the identified blemish regions (e.g., with outlines or identifiers) on the image or in a list. The user may use text input, touch input, or voice input to specify which ones of the identified blemish regions should be processed differently using a different procedure from the other blemish regions (e.g., pimples, bruises, discoloration, scars, etc.). In some embodiments, the device allows the user to specify the position and type of the blemish region, such that the device can select a predefined processing method for that blemish region. For example, if the user specifies that the blemish region on the left cheek is a pimple, the device will remove the pimple. If the user specifies that the blemish region near the nose region are freckles, the device will use a filter to lighten the freckles but not totally remove them. If the user specifies that the blemish region on the chin is a beauty mark, the device will remove the beauty mark, and replace it with a smaller and/or fainter version of the beauty mark. If the user specifies that the blemish region is a temporary scar, the device will remove it or lighten it. If the user specifies that the blemish region is a permanent scar, the device will lighten it or enhance it, depending on the user's preset preference.

In some embodiments, the device presents different versions of the beautifying processes, and allow the user to pick and choose the processing done to different blemish regions from different versions. For example, the cheek region should be done in accordance with the processing method used in version 1 of the beautifying process, and the chin region should be done in accordance with the processing method in version 2 of the beautifying process, etc. In some embodiments, the device produces a combination processing result in the end in accordance with the user's input regarding which processing version fits each of the detected blemish regions. Some of the blemish regions may be left as is, with no change from the original image. Other details of the image processing method are disclosed in other portions of the disclosure, and are not repeated here. The feature discussed in any part of the disclosure may be reasonably combined with other features disclosed in other parts of the disclosure.

The method for detecting a skin region in this embodiment of the present technology is described above. An apparatus for detecting a skin region in an embodiment of the present technology is described below.

Figure 4:
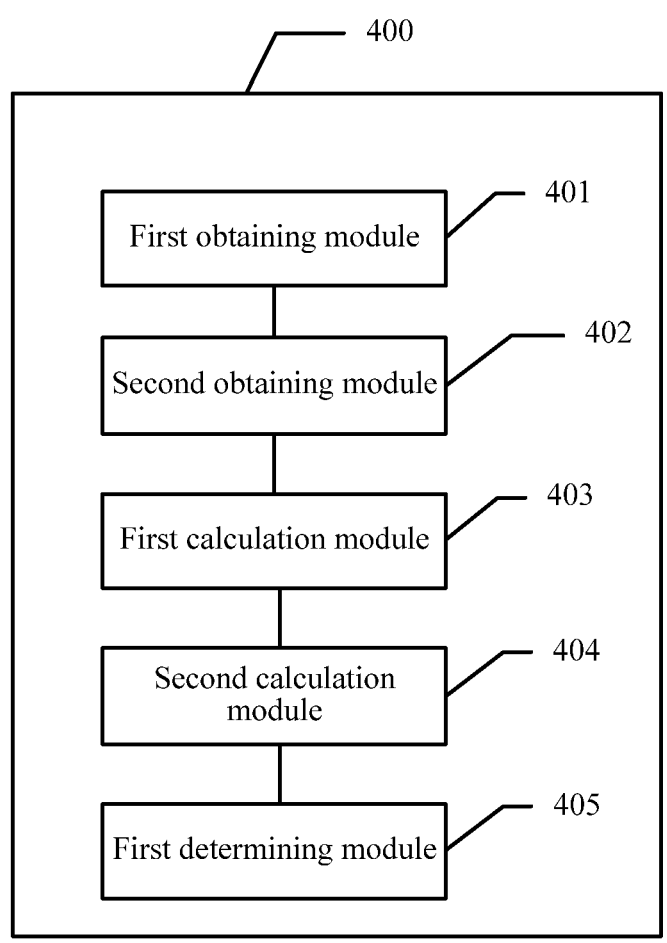
FIG. 4 is a schematic structural diagram of an embodiment of an apparatus for detecting a skin region according to the present disclosure.

Referring to FIG. 4, FIG. 4 is a schematic structural diagram of an embodiment of an apparatus for detecting a skin region according to the present disclosure. The apparatus for detecting a skin region in this embodiment may be configured to perform the method for detecting a skin region in the embodiment shown in FIG. 1. An apparatus 400 for detecting a skin region in this embodiment of the present technology includes:

a first obtaining module 401, configured to obtain a target image;

a second obtaining module 402, configured to obtain a preset mean value and a preset standard deviation of skin in an RGB color space and a preset mean value and a preset standard deviation of skin in a YUV color space;

a first calculation module 403, configured to calculate a first probability of each pixel in the target image according to the preset mean value and the preset standard deviation in the RGB color space, where the first probability is a probability that the pixel is skin in the RGB color space;

a second calculation module 404, configured to calculate a second probability of each pixel in the target image according to the preset mean value and the preset standard deviation in the YUV color space, where the second probability is a probability that the pixel is skin in the YUV color space; and a first determining module 405, configured to determine a probability that each pixel in the target image is skin, where the probability that the pixel is skin is an arithmetic mean value of the first probability and the second probability of the pixel.

After the probability that each pixel in the target image is skin is obtained, when a probability that a pixel is skin is greater than a particular threshold, image processing may be performed on the pixel. The processing may include processing such as brightening the pixel.

In this embodiment, after a preset mean value and a preset standard deviation of skin in an RGB color space and a preset mean value and a preset standard deviation of skin in a YUV color space are obtained, each pixel in a target image is separately compared with the preset mean value and the preset standard deviation of skin in the RGB color space and the preset mean value and the preset standard deviation of skin in the YUV color space, so that a probability that each pixel is skin can be accurately calculated. In this way, the probability can be combined in subsequent operations of processing the target image, a skin region in the target image can be determined more precisely for processing, and a skin region in the target image no longer needs to be manually determined before processing.

Optionally, the preset mean value of skin in the RGB color space includes a preset mean value $m_r$ of a red light component, a preset mean value $m_g$ of a green light component, and a preset mean value $m_b$ of a blue light component, and the preset standard deviation of skin in the RGB color space includes a preset standard deviation $n_r$ of the red light component, a preset standard deviation $n_g$ of the green light component, and a preset standard deviation $n_b$ of the blue light component; and the first calculation module 403 is specifically configured to:

calculate a first parameter i of the pixel according to a formula $i=1-|r-m_r|/3n_r$, where r is a luminance value of the red light component of the pixel, when $1-|r-m_r|/3n_r$ is less than 0, i=0, and when $1-|r-m_r|/3n_r$ is greater than 1, i=1;

calculate a second parameter j of the pixel according to a formula $j=1-|g-m_g|/3n_g$, where g is a luminance value of the green light component of the pixel, when $1-|g-m_g|/3n_g$ is less than 0, j=0, and when $1-|g-m_g|/3n_g$ is greater than 1, j=1;

calculate a third parameter k of the pixel according to a formula $k=1-|b-m_b|/3n_b$, where b is a luminance value of the blue light component of the pixel, when $1-|b-m_b|/3n_b$ is less than 0, i=0, and when $1-|b-m_b|/3n_b$ is greater than 1, k=1; and calculate the first probability P1 of the pixel according to a formula $P1=i1-i\times j1-j\times k1-k$.

Optionally, the preset mean value in the YUV color space includes preset mean values $m_u$ and $m_v$ of chrominance, and the preset standard deviation in the YUV color space includes preset standard deviations $n_u$ and $n_v$ of chrominance; and the second calculation module 404 is specifically configured to:

calculate a fourth parameter p of the pixel according to a formula $p=1-|u-m_u|/3n_u$, where u is a hue value of the pixel;

calculate a fifth parameter q of the pixel according to a formula $q=1-|v-m_v m_v, |/3n_v$, where v is a saturation value of the pixel; and calculate the second probability P2 of the pixel according to a formula $P2=p^{1-p}\times q^{1-q}$.

Figure 5:
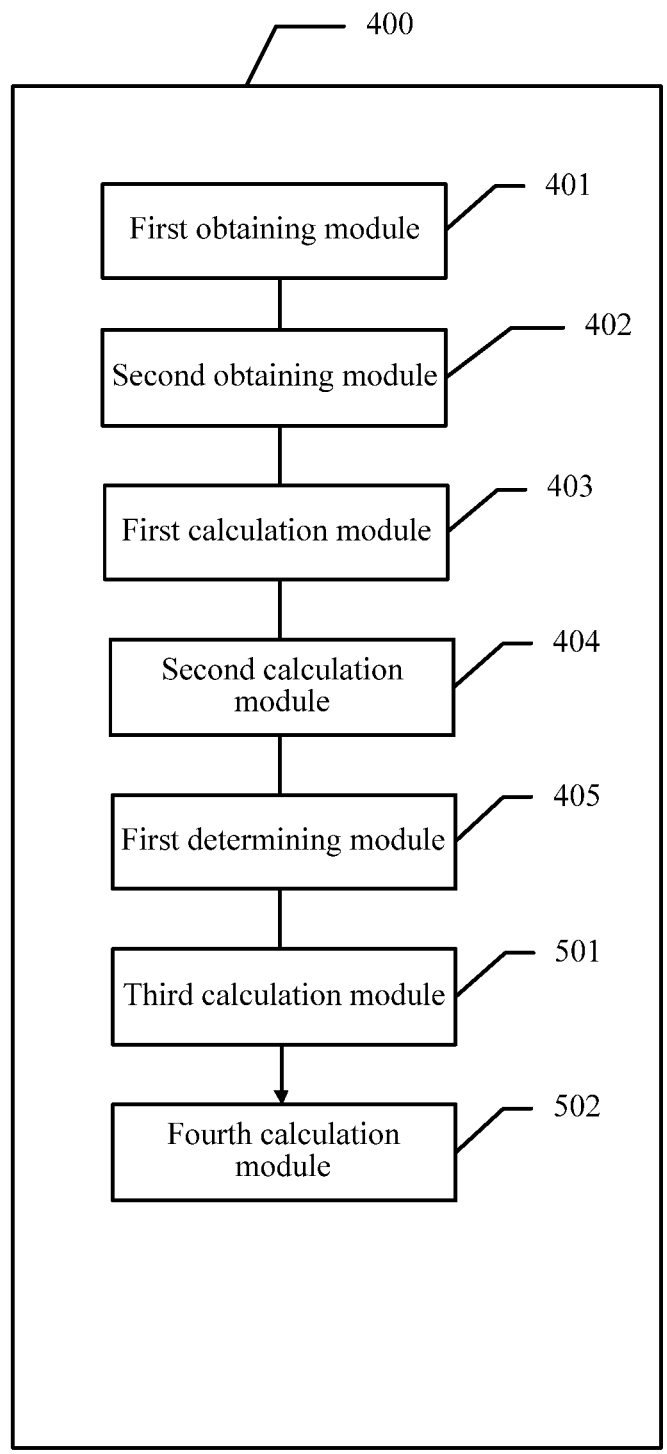
FIG. 5 is a schematic structural diagram of an embodiment of an apparatus for detecting a skin region according to the present disclosure.

Optionally, as shown in FIG. 5, the apparatus for detecting a skin region further includes:

a third calculation module 501, configured to: after the first determining module determines the probability that each pixel in the target image is skin, calculate a gray-scale value of each pixel in the target image, where the gray-scale value of the pixel is a product of the probability that the pixel is skin and 255; and a fourth calculation module 502, configured to: calculate the gray-scale value of each pixel in the target image by using a contour searching algorithm, and when a particular contour is obtained in the target image, set the gray-scale value of each pixel and a probability that each pixel in the particular contour is skin to 0, where the particular contour is a contour whose length and/or width is less than five pixels.

Figure 6:
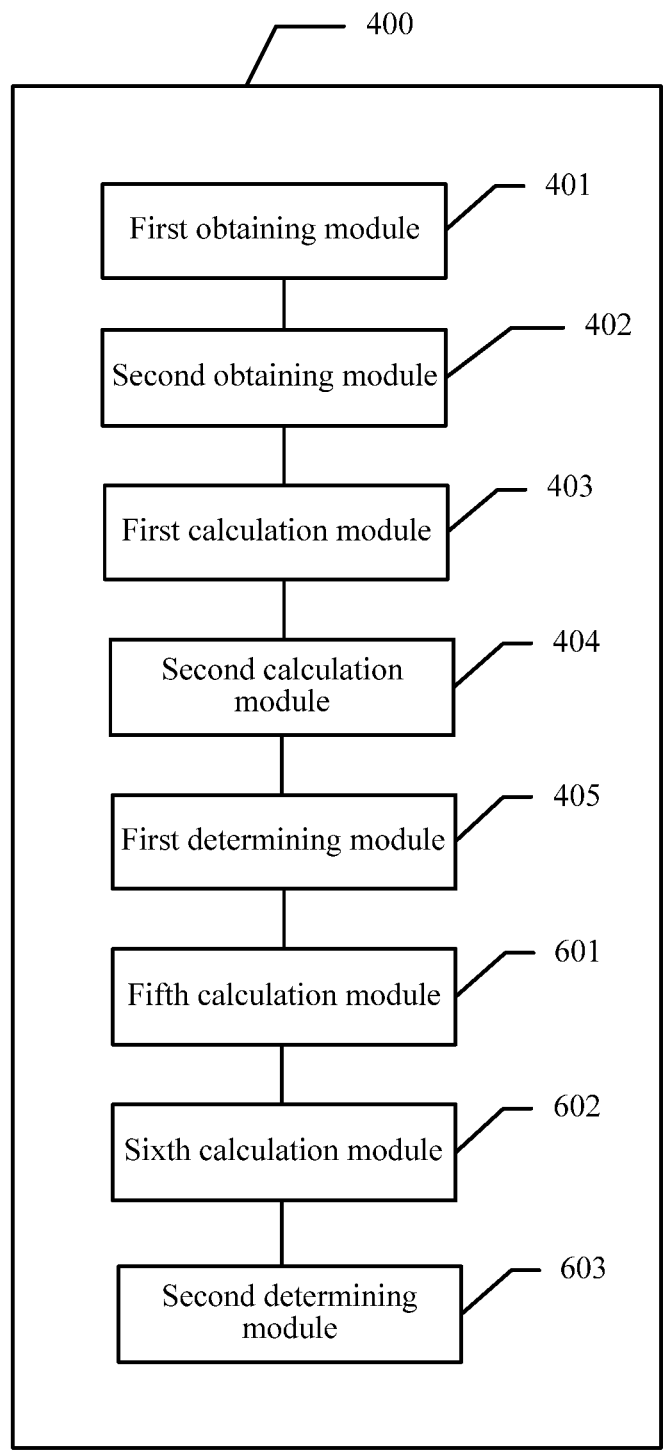
FIG. 6 is a schematic structural diagram of an embodiment of an apparatus for detecting a skin region according to the present disclosure.

Optionally, as shown in FIG. 6, the apparatus for detecting a skin region further includes:

a fifth calculation module 601, configured to: after the first determining module determines the probability that each pixel in the target image is skin, calculate a gray-scale value of each pixel in the target image, where the gray-scale value of the pixel is a product of the probability that the pixel is skin and 255;

a sixth calculation module 602, configured to perform a Gaussian blur on the gray-scale value of each pixel in the target image; and a second determining module 603, configured to determine the probability that each pixel in the target image is skin, where the probability that the pixel is skin is the Gaussian blurred gray-scale value of the pixel divided by 255.

The apparatus for detecting a skin region in this embodiment of the present technology is described from the perspective of unitized functional entities above, and the apparatus for detecting a skin region in this embodiment of the present technology is described below from the perspective of hardware processing.

Figure 7:
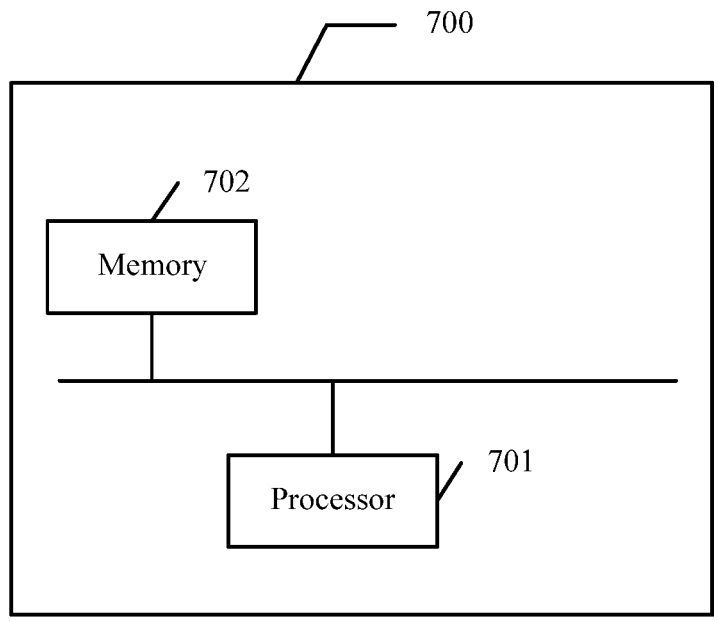
FIG. 7 is a schematic structural diagram of an embodiment of an apparatus for detecting a skin region according to the present disclosure.

Referring to FIG. 7, FIG. 7 is a schematic structural diagram of an embodiment of an apparatus for detecting a skin region according to the present disclosure. In this embodiment, an apparatus 700 for detecting a skin region includes:

a processor 701 and a memory 702 coupled to the processor 701, where the processor 701 reads a computer program stored in the memory 702 to perform the following operations:

obtaining a target image;

obtaining a preset mean value and a preset standard deviation of skin in an RGB color space and a preset mean value and a preset standard deviation of skin in a YUV color space;

calculating a first probability of each pixel in the target image according to the preset mean value and the preset standard deviation in the RGB color space, where the first probability is a probability that the pixel is skin in the RGB color space;

calculating a second probability of each pixel in the target image according to the preset mean value and the preset standard deviation in the YUV color space, where the second probability is a probability that the pixel is skin in the YUV color space; and determining a probability that each pixel in the target image is skin, where the probability that the pixel is skin is an arithmetic mean value of the first probability and the second probability of the pixel.

In a first possible implementation manner of the present disclosure, the preset mean value of skin in the RGB color space includes a preset mean value $m_r$ of a red light component, a preset mean value $m_g$ of a green light component, and a preset mean value $m_b$ of a blue light component, and the preset standard deviation of skin in the RGB color space includes a preset standard deviation $n_r$ of the red light component, a preset standard deviation $n_g$ of the green light component, and a preset standard deviation $n_b$ of the blue light component; and the calculating a first probability of each pixel in the target image according to the preset mean value and the preset standard deviation in the RGB color space includes:

calculating a first parameter i of the pixel according to a formula $i=1-|r-m_r|/3n_r$, where r is a luminance value of the red light component of the pixel, when $1-|r-m_r|/3n_r$ is less than 0, i=0, and when $1-|r-m_r|/3n_r$ is greater than 1, i=1;

calculating a second parameter j of the pixel according to a formula $j=1-|g-m_g|/3n_g$, where g is a luminance value of the green light component of the pixel, when $1-|g-m_g|/3n_g$ is less than 0, j=0, and when $1-|g-m_g|/3n_g$ is greater than 1, j=1;

calculating a third parameter k of the pixel according to a formula $k=1-|b-m_b|/3n_b$, where b is a luminance value of the blue light component of the pixel, when $1-|b-m_b|/3n_b$ is less than 0, i=0, and when $1-|b-m_b|/3n_b$ is greater than 1, k=1; and calculating the first probability P1 of the pixel according to a formula $P1=i1-i\times j1-j\times k1-k$.

In a second possible implementation manner of the present disclosure, the preset mean value in the YUV color space includes preset mean values $m_u$ and $m_v$ of chrominance, and the preset standard deviation in the YUV color space includes preset standard deviations $n_u$ and $n_v$ of chrominance; and the calculating a second probability of each pixel in the target image according to the preset mean value and the preset standard deviation in the YUV color space includes:

calculating a fourth parameter p of the pixel according to a formula $p=1-|u-m_u|/3n_u$, where u is a hue value of the pixel;

calculating a fifth parameter q of the pixel according to a formula $q=1-|v-m_v m_v|/3n_v$, where v is a saturation value of the pixel; and calculating the second probability P2 of the pixel according to a formula $P2=p^{1-p}\times q^{1-q}$.

In a third possible implementation manner of the present disclosure, after the determining a probability that each pixel in the target image is skin, the processor 701 further performs the following steps:

calculating a gray-scale value of each pixel in the target image, where the gray-scale value of the pixel is a product of the probability that the pixel is skin and 255; and calculating the gray-scale value of each pixel in the target image by using a contour searching algorithm, and when a particular contour is obtained in the target image, setting the gray-scale value of each pixel and a probability that each pixel in the particular contour is skin to 0, where the particular contour is a contour whose length and/or width is less than five pixels.

In a fourth possible implementation manner of the present disclosure, after the determining a probability that each pixel in the target image is skin, the processor 701 further performs the following steps:

calculating a gray-scale value of each pixel in the target image, where the gray-scale value of the pixel is a product of the probability that the pixel is skin and 255;

performing a Gaussian blur on the gray-scale value of each pixel in the target image; and determining the probability that each pixel in the target image is skin, where the probability that the pixel is skin is the Gaussian blurred gray-scale value of the pixel divided by 255.

Figure 8:
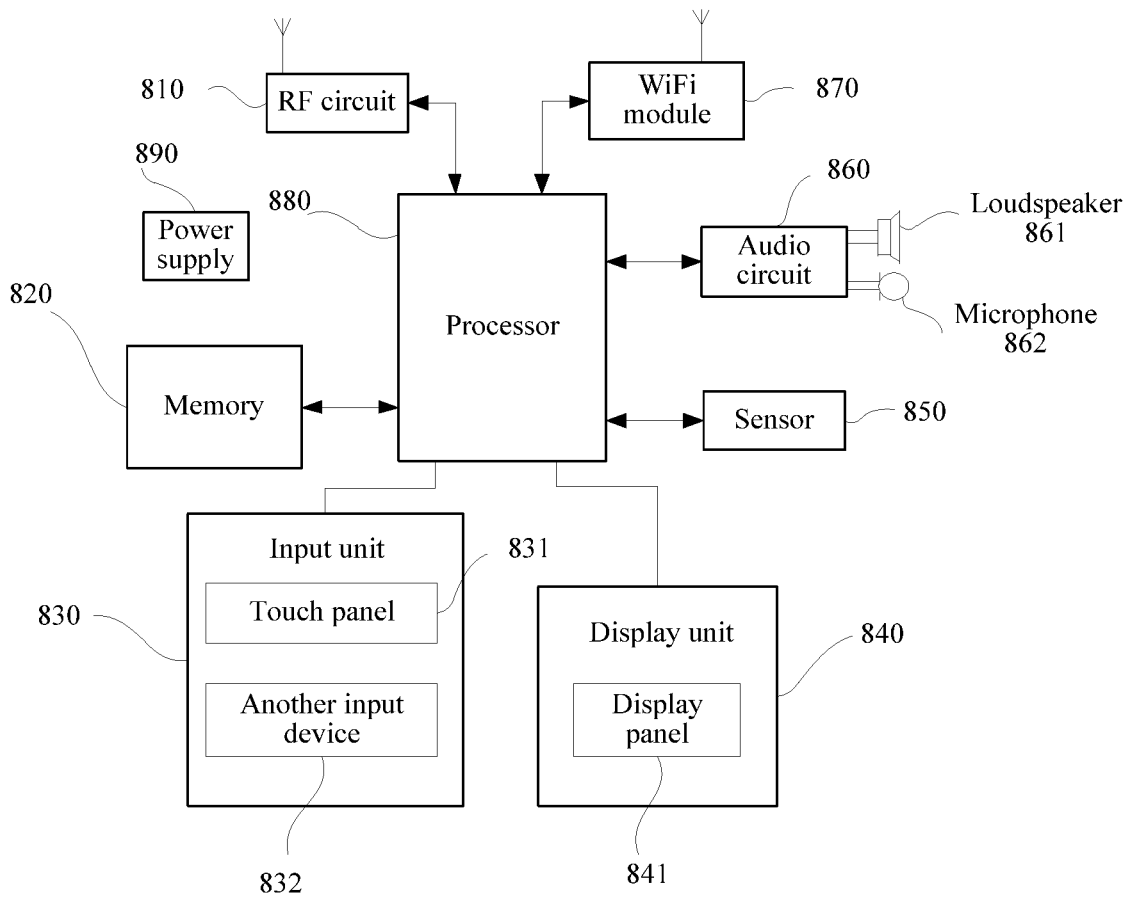
FIG. 8 is a schematic structural diagram of an embodiment of an apparatus for detecting a skin region according to the present disclosure.

An embodiment of the present technology further provides another apparatus for detecting a skin region. As shown in FIG. 8, for ease of description, only parts related to the embodiments of the present technology are shown. For specific technical details that are not disclosed, refer to the method part in the embodiments of the present technology. The terminal may be any terminal device such as a mobile phone and a computer. The following uses a mobile phone as an example for description.

FIG. 8 is a block diagram of the structure of a part of a mobile phone related to a terminal according to an embodiment of the present technology. Referring to FIG. 8, the mobile phone includes components such as a radio frequency (RF) circuit 810, a memory 820, an input unit 830, a display unit 840, a sensor 850, an audio circuit 860, a wireless fidelity (Wi-Fi) module 870, a processor 880, and a power supply 890. A person skilled in the art may understand that the structure of the mobile phone shown in FIG. 8 does not constitute a limitation to the mobile phone, and the mobile phone may include more components or fewer components than those shown in the figure, or some components may be combined, or a different component deployment may be used.

The following specifically describes the components of the mobile phone with reference to FIG. 8.

The RF circuit 810 may be configured to receive and send signals during an information receiving and sending process or a call process. Particularly, the RF circuit 810 receives downlink information from a base station, then delivers the downlink information to the processor 880 for processing, and sends related uplink data to the base station. Generally, the RF circuit 810 includes, but is not limited to, an antenna, at least one amplifier, a transceiver, a coupler, a low noise amplifier (LNA), and a duplexer. In addition, the RF circuit 810 may also communicate with a network and another device by means of wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 820 may be configured to store a software program and module. The processor 880 runs the software program and module stored in the memory 820, to implement various functional applications and data processing of the mobile phone. The memory 820 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 820 may include a high speed random access memory (RAM), and may also include a non-volatile memory such as at least one magnetic disk storage device, a flash memory, or another volatile solid-state storage device.

The input unit 830 may be configured to receive input digit or character information, and generate a keyboard signal input related to the user setting and function control of the mobile phone. Specifically, the input unit 830 may include a touch panel 831 and another input device 832. The touch panel 831, which may also be referred to as a touch screen, may collect a touch operation of a user on or near the touch panel (such as an operation of a user on or near the touch panel 831 by using any suitable object or accessory such as a finger or a stylus), and drive a corresponding connection apparatus according to a preset program. Optionally, the touch panel 831 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 880. Moreover, the touch controller can receive and execute a command sent from the processor 880. In addition, the touch panel 831 may be a resistive, capacitive, infrared, or surface sound wave type touch panel. In addition to the touch panel 831, the input unit 830 may further include the another input device 832. Specifically, the another input device 832 may include, but is not limited to, one or more of a physical keyboard, a functional key (such as a volume control key or a switch key), a track ball, a mouse, and a joystick.

The display unit 840 may be configured to display information input by the user or information provided for the user, and various menus of the mobile phone. The display unit 840 may include a display panel 841. Optionally, the display panel 841 may be configured by using a liquid crystal display (LCD), an organic light-emitting diode (OLED), or the like. Further, the touch panel 831 may cover the display panel 841. After detecting a touch operation on or near the touch panel 831, the touch panel 831 transfers the touch operation to the processor 880, so as to determine the type of the touch event. Then, the processor 880 provides a corresponding visual output on the display panel 841 according to the type of the touch event. Although, in FIG. 8, the touch panel 831 and the display panel 841 are used as two separate parts to implement input and output functions of the mobile phone, in some embodiments, the touch panel 831 and the display panel 841 may be integrated to implement the input and output functions of the mobile phone.

The mobile phone may further include at least one sensor 850, such as an optical sensor, a motion sensor, and other sensors. Specifically, the optical sensor may include an ambient light sensor and a proximity sensor. The ambient light sensor may adjust luminance of the display panel 841 according to brightness of the ambient light. The proximity sensor may switch off the display panel 841 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 860, a loudspeaker 861, and a microphone 862 may provide audio interfaces between the user and the mobile phone. The audio circuit 860 may convert received audio data into an electric signal and transmit the electric signal to the loudspeaker 861. The loudspeaker 861 converts the electric signal into a sound signal for output. On the other hand, the microphone 862 converts a collected sound signal into an electric signal. The audio circuit 860 receives the electric signal and converts the electric signal into audio data, and outputs the audio data to the processor 880 for processing. Then, the processor 880 sends the audio data to, for example, another mobile phone by using the RF circuit 810, or outputs the audio data to the memory 820 for further processing.

Wi-Fi belongs to a short distance wireless transmission technology. The mobile phone may help, by using the Wi-Fi module 870, the user to receive and send e-mails, browse a webpage, access streaming media, and so on, which provides wireless broadband Internet access for the user. Although FIG. 8 shows the Wi-Fi module 870, it may be understood that the Wi-Fi module 870 is not a necessary component of the mobile phone, and when required, the Wi-Fi module 870 may be omitted as long as the scope of the essence of the present disclosure is not changed.

The processor 880 is the control center of the mobile phone, and is connected to various parts of the mobile phone by using various interfaces and lines. By running or executing the software program and/or module stored in the memory 820, and invoking data stored in the memory 820, the processor 880 performs various functions and data processing of the mobile phone, thereby performing overall monitoring on the mobile phone. Optionally, the processor 880 may include one or more processing units. Preferably, the processor 880 may integrate an application processor and a modem. The application processor mainly processes an operating system, a user interface, an application program, and the like. The modem mainly processes wireless communication. It may be understood that the foregoing modem may either not be integrated into the processor 880.

The mobile phone further includes the power supply 890 (such as a battery) for supplying power to the components. Preferably, the power supply may be logically connected to the processor 880 by using a power management system, thereby implementing functions such as charging, discharging and power consumption management by using the power management system.

Although not shown in the figure, the mobile phone may further include a camera, a Bluetooth module, and the like. The camera may be configured to take a photo by a user, and then the processor performs, according to the method of the present disclosure, skin detection on the photo taken by the user, detects a region in which skin is located, and then processes the region in which skin is located.

In this embodiment of the present technology, the processor 880 included in the terminal has the function of performing the foregoing method process.

Persons skilled in the art can clearly understand that, for convenience and simplicity of description, the specific work process of the systems, devices, and units described above can be referred to the corresponding process in the aforementioned method embodiments, which are no longer repeated here.

In the embodiments provided by the present application, it should be understood that the systems, devices, and methods disclosed may be implemented in other forms. For example, the device embodiments described above are merely exemplary. For example, the division of units is merely logical functional division, and there are other division forms in real application. For example, multiple units or components may be combined or be integrated to another system, or some features may be ignored or not be executed. In another aspect, the coupling, direct coupling, or communication connection there between which is displayed or discussed may be indirect coupling or communication connection of interfaces, devices, or units, and may be electrical, mechanical, or in other forms.

Units described as separate components may be or may not be physically separated. Components shown as units may be or may not be physical units, that is, may be integrated or distributed to a plurality of network units. Some or all of the modules may be selected to achieve the objective of the solution of the embodiment according to actual demands.

In addition, functional units in the embodiments of the present technology may be integrated into one processing unit, or each of the units may exist alone physically, or two or more units are integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the existing technology, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present technology. The foregoing storage medium includes: any medium that can store program code, such as a USB flash drive, a removable hard disk, a read-only memory (ROM), a RAM, a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present technology.

What is claimed is:

1. A method for detecting a skin region in a target image performed at a computing device having one or more processors and memory storing a plurality of programs to be executed by the one or more processors, the method comprising:

for a plurality of pixels in the target image,
selecting, among the plurality of pixels, a pixel in the target image;
calculating a first probability of the pixel in the target image in a first color space, the first probability being a probability that the pixel represents skin in the first color space;
calculating a second probability of the pixel in the target image in a second color space that is distinct from the first color space, the second probability being a probability that the pixel represents skin in the second color space;
determining a combined probability that the pixel in the target image represents skin based on the first probability and the second probability of the pixel;

including the pixel into a skin region in the target image when the pixel's combined probability is greater than a predefined threshold;

performing a predefined beautifying process to the skin region of pixels by:
  calculating a gray-scale value of each pixel in the skin region according to the pixel's combined probability, wherein the gray-scale value of the pixel is a product of the combined probability that the pixel represents skin and 255;
  identifying one or more contours within the skin region based on the gray-scale values of the pixels in the skin region that meet predefine size criteria; and
  resetting respective pixel values of pixels in the identified contours to be 0.

2. The method of claim 1, wherein the first color space is an RGB color space and the second color space is a YUV color space.

3. The method of claim 2, wherein calculating the first probability of the pixel in the target image in the RGB color space includes calculating the first probability of the pixel according to a preset mean value and a preset standard deviation value of skin in the RGB color space.

4. The method of claim 3, wherein calculating the second probability of the pixel in the target image in the YUV color space includes calculating the second probability of the pixel according to a preset mean value and a preset standard deviation value of skin in the YUV color space.

5. The method of claim 4, wherein the preset mean value and the preset standard deviation value of skin in the RGB color space, and the preset mean value and the preset standard deviation value of skin in the YUV space are derived from the same set of training images that include regions corresponding to skin.

6. The method of claim 1, further comprising:
  performing a Gaussian blur on the gray-scale value of each pixel of the pixels in the skin region; and
  determining the probability that each pixel in the skin region represents skin based on the Gaussian blurred gray-scale value of the pixel divided by 255.

7. A computing device, comprising:
one or more processors;
memory coupled to the one or more processors; and
a plurality of instructions stored in the memory, the plurality of instructions, when executed by the one or more processors, cause the one or more processors to perform operations comprising:
  for a plurality of pixels in the target image,
    selecting, among the plurality of pixels, a pixel in the target image;
    calculating a first probability of the pixel in the target image in a first color space, the first probability being a probability that the pixel represents skin in the first color space;
    calculating a second probability of the pixel in the target image in a second color space that is distinct from the first color space, the second probability being a probability that the pixel represents skin in the second color space;
    determining a combined probability that the pixel in the target image represents skin based on the first probability and the second probability of the pixel;
    including the pixel into a skin region in the target image when the pixel's combined probability is greater than a predefined threshold;
  performing a predefined beautifying process to the skin region of pixels by:
    calculating a gray-scale value of each pixel in the skin region according to the pixel's combined probability, wherein the gray-scale value of the pixel is a product of the combined probability that the pixel represents skin and 255;
    identifying one or more contours within the skin region based on the gray-scale values of the pixels in the skin region that meet predefine size criteria; and
    resetting respective pixel values of pixels in the identified contours to be 0.

8. The computing device of claim 7, wherein the first color space is an RGB color space and the second color space is an YUV color space.

9. The computing device of claim 8, wherein calculating the first probability of the pixel in the target image in the RGB color space includes calculating the first probability of the pixel according to a preset mean value and a preset standard deviation value of skin in the RGB color space.

10. The computing device of claim 9, wherein calculating the second probability of the pixel in the target image in the YUV color space includes calculating the second probability of the pixel according to a preset mean value and a preset standard deviation value of skin in the YUV color space.

11. The computing device of claim 10, wherein the preset mean value and the preset standard deviation value of skin in the RGB color space, and the preset mean value and the preset standard deviation value of skin in the YUV space are derived from the same set of training images that include regions corresponding to skin.

12. The computing device of claim 7, wherein the operations include:
  performing a Gaussian blur on the gray-scale value of each pixel of the pixels in the skin region; and
  determining the probability that each pixel in the skin region represents skin based on the Gaussian blurred gray-scale value of the pixel divided by 255.

13. A non-transitory computer-readable storage medium for detecting a skin region in an image, the computer-readable storage medium storing instructions, the instructions, when executed by one or more processors, cause the processors to perform operations comprising:
  for a plurality of pixels in the target image,
    selecting, among the plurality of pixels, a pixel in the target image;
    calculating a first probability of the pixel in the target image in a first color space, the first probability being a probability that the pixel represents skin in the first color space;
    calculating a second probability of the pixel in the target image in a second color space that is distinct from the first color space, the second probability being a probability that the pixel represents skin in the second color space;
    determining a combined probability that the pixel in the target image represents skin based on the first probability and the second probability of the pixel;
    including the pixel into a skin region in the target image when the pixel's combined probability is greater than a predefined threshold;
  performing a predefined beautifying process to the skin region of pixels by:
    calculating a gray-scale value of each pixel in the skin region according to the pixel's combined probability, wherein the gray-scale value of the pixel is a product of the combined probability that the pixel represents skin and 255;

identifying one or more contours within the skin region based on the gray-scale values of the pixels in the skin region that meet predefine size criteria; and resetting respective pixel values of pixels in the identified contours to be 0.

14. The non-transitory computer-readable storage medium of claim 13, wherein the first color space is an RGB color space and the second color space is an YUV color space.

15. The non-transitory computer-readable storage medium of claim 14, wherein calculating the first probability of the pixel in the target image in the RGB color space includes calculating the first probability of the pixel according to a preset mean value and a preset standard deviation value of skin in the RGB color space.

16. The non-transitory computer-readable storage medium of claim 15, wherein calculating the second probability of the pixel in the target image in the YUV color space includes calculating the second probability of the pixel according to a preset mean value and a preset standard deviation value of skin in the YUV color space.

17. The non-transitory computer-readable storage medium of claim 16, wherein the preset mean value and the preset standard deviation value of skin in the RGB color space, and the preset mean value and the preset standard deviation value of skin in the YUV space are derived from the same set of training images that include regions corresponding to skin.

\* \* \* \* \*